Patented Oct. 21, 1941

2,259,602

UNITED STATES PATENT OFFICE 2,259,602

MANUFACTURE OF SUBSTITUTED AMIDES

Alfred William Baldwin, Henry Alfred Piggott, and Francis Sydney Statham, Blackley, Manchester, England, assignors to Imperial Chemical Industries, a corporation of Great Britain No Drawing. Application December 14, 1938, Serial No. 245,769. In Great Britain December 28, 1937

5 Claims. (Cl. 260—401)

This invention relates to the manufacture of sulphonated amides. More particularly it relates to the manufacture of sulphonated derivatives of amidomethylphenols or amidomethylphenol ethers of the formula RCONH—CH$_2$—Ar—O—R′ wherein R is an aliphatic radical of at least eight carbon atoms, R′ is hydrogen or a hydrocarbon radical of the aliphatic, aliphatic-aromatic or aromatic series which may carry substituents, for example, halogen atoms, ester, hydroxy or alkoxy groups, and Ar is an aromatic radical of the benzene or naphthalene series which may carry substituents additional to those shown, for example, halogen atoms, alkyl, alkoxy or hydroxy groups.

This invention has as an object to devise a new method of manufacturing such sulphonated amides. A further object is to provide such sulphonated amides. Further objects will appear hereinafter. These objects are accomplished by the following invention.

We have found that we can manufacture the said sulphonated amides by causing to interact together a suitable phenol or phenol ether, a sulphonating agent, an amide of the formula R—CO—NH$_2$ (R having the same meaning as given above) with formaldehyde or a formaldehyde-yielding substance, e. g. paraformaldehyde, when necessary in the presence also of a condensing agent. The interaction of these ingredients can be carried out simultaneously or in stages.

According to the invention we make the said sulphonated amides, either by direct sulphonation of amidomethylphenols or amidomethylphenol ethers of the general formula given above, or by causing a suitable sulphonated phenol or sulphonated phenol ether to react, in the presence of an acidic condensing agent, with formaldehyde (or a formaldehyde-yielding substance) and an amide of the formula RCONH$_2$ (R having the meaning given above) or with the methylol derivative of such an amide, or by a combined process of condensation and sulphonation in which there are caused to interact together, apparently simultaneously, a suitable phenol or phenol ether, a sulphonating agent and the methylol derivative of an amide of formula RCONH$_2$ (R having the same meaning as before), or a mixture of such an amide with formaldehyde or a formaldehyde-yielding substance.

The term "suitable" as used above is intended merely to indicate that the phenol or phenol ether or sulphonated phenol or sulphonated phenol ether to be used must have such a structure that the sulphonated amido-derivative made therefrom by the appropriate process is a sulphonated derivative of a substituted amide of the formula given above, that is to say, it must be a compound of the formula H—Ar—O—R′, in which Ar and R′ have the same significance as before.

The amidomethylphenols or amidomethyl phenol ethers of the general formula given above which are used as starting materials in one embodiment of the invention may be conveniently obtained by causing a phenol or a phenol ether to react in the presence of a condensing agent, such as zinc chloride, aluminium chloride or hydrochloric acid, with formaldehyde (or a formaldehyde-yielding substance, e. g. paraformaldehyde) and an amide of the formula R.CONH$_2$, wherein R is an aliphatic radical of at least eight carbon atoms, or with the methylol derivative of such an amide.

In carrying into effect the embodiment of the invention wherein the amidomethylphenols or amidomethylphenol ethers are directly sulphonated, the reactant is mixed with sulphonating agent, for example, sulphuric acid monohydrate, oleum or chlorosulphonic acid, if desired together with a solvent or diluent, and the mixture is stirred at ordinary or moderately elevated temperature for a few hours. The sulphonated product is purified and isolated by the usual methods. If desired, the reaction mixture is neutralized with a base, for example caustic soda, and the sulphonated product is isolated in the form of a salt.

As amides which may be used as such or in the form of their methylol derivatives for the production of the amidomethylphenols or amidomethylphenol ethers referred to above, or which may be used in other embodiments of the invention, there may be mentioned, for example, lauramide, myristamide, palmitamide, stearamide, oleamide, and the amides of the coconut oil fatty acids. The methylol derivatives of these amides are conveniently prepared by causing the respective amides to react with formaldehyde in the presence of alkaline condensing agents such as, for example, alkali metal hydroxides or carbonates, baryta or potassium cyanide.

As phenols and phenol ethers which may be used for the production of the amidomethylphenols or amidomethylphenol ethers referred to above or which may be used in other embodiments of the invention there may be mentioned, for example, phenol, resorcinol, technical cresols, o-chlorophenol, methyl salicylate, β-naphthol, anisole, phenetole, methyl ether of technical cresols, resorcinol dimethyl ether, diphenyl ether, benzyl phenyl ether, methyl phenoxyacetate, β-phenoxyethanol, β-phenoxyethyl methyl ether, tolyl methyl ether and β-toloxyethyl chloride (wherein the toloxy radical is that corresponding to a technical mixture of cresols).

In carrying into effect the embodiment of the invention wherein a phenol or a phenol ether, an amide and formaldehyde (or formaldehyde-yielding substance) or a methylol derivative of an amide, and a condensing and sulphonating agent, for example, sulphuric acid, are caused to interact together, the reactants are mixed and the mixture is stirred at an ordinary or moderately decreased temperature for some hours, the mixture is allowed to stand and the sulphonated product is isolated by the usual methods, preferably in the form of a salt, for example, a sodium salt.

As sulphonated phenols or sulphonated phenol ethers, which may be reacted, in the presence of a condensing agent with an amide and formaldehyde (or a formaldehyde-yielding substance) or with a methylol derivative of an amide, according to a further embodiment of the invention, there may be mentioned, for example, phenol-p-sulphonic acid, anisole-o-sulphonic acid, sodium-2-naphthol-3:6-disulphonate and potassium 2-methoxynaphthalene-6-sulphonate.

As acidic condensing agents there may be used, for example, acids such as hydrochloric acid, or acid reacting substances such as zinc chloride or aluminium chloride. As formaldehyde-yielding substances, whilst it is preferred to use paraformaldehyde, there may also be used hexamethylene tetramine or aldehyde-bisulphite compounds.

In carrying into effect this embodiment of the invention the sulphonated phenol or sulphonated phenol ether is mixed with the other reactants, and the mixture is stirred at an ordinary or moderately elevated temperature for some hours. If desired, the reaction is effected in the presence of a solvent or diluent such as, for example, glacial acetic acid. The product is purified and isolated by the usual methods, preferably in the form of a salt, for example, a sodium salt.

The invention is illustrated but not limited by the following examples, in which the parts are by weight.

Example 1

15 parts of stearohydroxybenzylamide are added to 45 parts of sulphuric acid monohydrate and the viscous solution so obtained is stirred and heated at 40–45° C. until a sample dissolves in water to give a clear solution. The reaction mixture is then neutralized with caustic soda and allowed to cool. A white solid separates and is filtered off; it dissolves in hot water forming a clear foaming solution. If desired, the solid may be freed from any accompanying inorganic salts by recrystallization from hot water. The compound obtained has the following probable formula:

The stearohydroxybenzylamide used in this example was obtained by mixing and stirring together at 70°–80° C. for two hours, 20 parts of stearohydroxymethylamide, 40 parts of phenol and 20 parts of anhydrous zinc chloride. The mixture was then poured into water and the excess phenol removed by steam distillation. The white solid which separated out was filtered off and freed from zinc chloride by washing with boiling water.

Example 2

10 parts of dihydroxybenzylstearamide (obtained by condensing resorcinol with stearohydroxymethylamide) are slowly added to 40 parts of sulphuric acid monohydrate at a temperature of 50° C.; the mixture is stirred and maintained at this temperature until a test portion dissolves in water forming a clear solution. The mixture is then poured on to ice, neutralized with caustic soda and evaporated to dryness. The dried mass is extracted with boiling methanol, the methanol extract is evaporated and the sulphonated amide salt is thus isolated in the form of a deep yellow powder, which readily dissolves in water forming a clear, foaming solution. The compound thus obtained has the following probable formula:

Using a procedure similar to that described in this example there have also been obtained sulphonates of chlorohydroxybenzylstearamide (obtained by condensing o-chlorophenol with stearohydroxymethylamide), β-hydroxynaphthylmethylstearamide, dimethoxybenzylstearamide (obtained by condensing resorcinol dimethyl ether with stearohydroxymethylamide), phenoxybenzylstearamide, benzyloxybenzylstearamide and methoxymethylbenzylamide of the coconut oil fatty acids (obtained by condensing the methyl ether of a technical mixture of cresols with the hydroxymethylamide of the coconut oil fatty acids). The salts all dissolve in water forming clear, foaming solutions.

Example 3

20 parts of β-methoxyethoxybenzylstearamide (obtained by condensing stearohydroxymethylamide with β-phenoxyethylmethyl ether) are gradually added to 120 parts of sulphuric acid monohydrate at 50° C. and the mixture is then stirred and maintained at 50° C. until a test portion dissolves in water forming a clear solution. The reaction mixture is then poured into a mixture of 200 parts of ice and 300 parts of water and stirred for a short time. The new sulphonic acid, which separates in the form of white crystals, is filtered off, washed with a little ice-water, collected and dried. The compound thus obtained has the following probable formula:

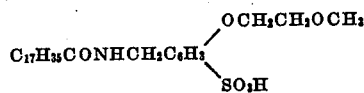

Example 4

20 parts of the amide obtained by condensing laurohydroxymethylamide with methyl phenoxyacetate are added to 40 parts of sulphuric acid monohydrate at 20–25° C. and the mixture is stirred for 18 hours. The reaction mixture is poured into ice, neutralized with caustic soda, the temperature being maintained below 20° C., and the so obtained solution is evaporated to dryness. There is thus obtained a white powder which dissolves in water forming a clear foaming solution. The compound thus obtained has the following probable formula:

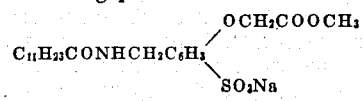

Example 5

15 parts of the hydroxybenzylamide of coconut oil fatty acids (obtained by condensing the hydroxymethylamide of coconut oil fatty acids with phenol) are added to 30 parts of sulphuric acid monohydrate and the mixture is then stirred and maintained at 35° C. until a test portion dissolves in water forming a clear solution. The reaction mixture is poured into ice, neutralized with caustic soda and allowed to cool. The salt of the sulphonated amide which crystallizes out is filtered off and collected. The salt dissolves in hot water forming a clear foaming solution. The compound thus obtained has the following probable formula:

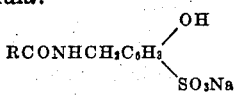

wherein RCO stands for the mixture of acyl radicals contained in coconut oil fatty acids.

Using a similar procedure there has also been obtained from hydroxymethylbenzylstearamide (obtained by condensing stearohydroxymethylamide and a technical mixture of cresols) a sodium sulphonate, which is a white solid which dissolves in hot water forming a clear, foaming solution.

Example 6

20 parts of lauromethoxybenzylamide (obtained by condensing laurohydroxymethylamide with anisole) are added to 40 parts of sulphuric acid monohydrate and the viscous solution so obtained is stirred at 30°–40° C. until a sample dissolves in water forming a clear solution. The reaction mixture is then neutralized with caustic soda and evaporated to dryness. There is thus obtained a white solid which is readily soluble in water. It is conveniently ground to a powder and may then be used as a scouring, lathering, wetting-out or foaming agent. If it is desired further to purify the product, the solid is extracted with boiling methanol. The inorganic salts present remain undissolved and are removed by filtration. The salt of sulphonated lauromethoxybenzylamide is recovered by evaporation of the filtrate. The compound thus obtained has the following probable formula:

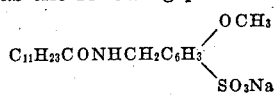

Using a similar procedure there has also been obtained from the methoxybenzylamide of coconut oil fatty acids (obtained by condensing the hydroxymethylamide of coconut oil fatty acids with anisole) a sodium sulphonate, which is a cream coloured solid which dissolves in cold water forming a clear foaming solution.

Example 7

22 parts of anisole are slowly added with stirring to 72 parts of sulphuric acid monohydrate, the temperature of the liquid being maintained below 10° C. When about half of the anisole has been added, a gradual addition of 31 parts of stearohydroxymethylamide is begun; thenceforth the anisole and stearohydroxymethylamide are added simultaneously. The stirring is continued at a temperature below 10° C. for 16 hours, during which time the mixture becomes very viscous. 18 parts of sulphuric acid monohydrate are now added and after stirring to ensure uniform mixing of the components, the mixture is allowed to stand for 4 days. The reaction mass is then neutralized with caustic soda and evaporated to dryness. The solid thus obtained is extracted with boiling methanol. Inorganic salts remain undissolved and are filtered off. On cooling the filtrate, the sulphonated amide salt crystallizes out and is filtered off. It is freed from water-insoluble substances by extraction with hot acetone. The residue then dissolves readily in water forming foaming solutions. The compound thus obtained has the following probable formula:

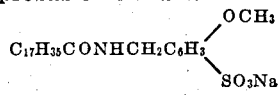

Example 8

54 parts of anisole are slowly added with stirring to 500 parts of sulphuric acid monohydrate, the temperature of the liquid being maintained below 10° C. When about half the anisole is added, a gradual addition of a mixture of 95 parts of stearamide and 15 parts of paraformaldehyde is commenced and thenceforth this mixture is added together with the anisole to the sulphuric acid. The mixture is stirred and the temperature maintained below 10° C. for 16 hours. After standing for 4 days the reaction mixture is poured onto ice, neutralized with caustic soda and evaporated to dryness. The dried mass is extracted with boiling methanol, the extract is filtered from inorganic salts and allowed to cool. The sulphonated amide salt which crystallizes from the filtrate is filtered off, collected and freed from water-insoluble matter by extracting with boiling acetone. The salt thus obtained dissolves readily in water forming foaming solutions. The compound thus obtained has the same probable formula as the compound which is prepared in accordance with the procedure outlined in Example 7.

Example 9

17.6 parts of laurohydroxymethylamide, 7 parts of sodium 2-naphthol-3:6-disulphonate, 6 parts of anhydrous zinc chloride and 30 parts of glacial acetic acid are stirred together and maintained at 60° C. for 18 hours. The mixture is then cooled, diluted with ether, the solid which precipitates is filtered off and dissolved in cold water. The solution is filtered from traces of insoluble matter, sodium carbonate is added until the liquid is alkaline to brilliant yellow paper, the zinc oxide which precipitates is removed by filtration and the solution is evaporated to dryness. The dried mass is then extracted with boiling methanol and the methanol extract is evaporated, whereby there is obtained the new compound in the form of a yellow solid, which readily dissolves in water forming a clear, foaming solution. The compound thus obtained has the following probable formula:

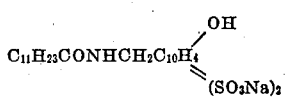

Example 10

6 parts of stearohydroxymethylamide, 6 parts of potassium 2-methoxynaphthalene-6-sulphonate and 6 parts of anhydrous zinc chloride are mixed with 40 parts of glacial acetic acid and the mixture is stirred for 16 hours at 60° C. The reaction mixture is then poured into water, whereupon a solid separates out. This is filtered off and purified, if desired, by crystallization from methanol. The product so obtained (either before or after recrystallization) dissolves in hot water forming a clear, foaming solution. The compound thus obtained is the salt of a sulphonic acid having the following probable formula:

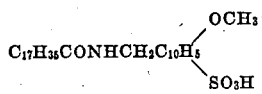

Example 11

15.6 parts of oleohydroxymethylamide, 6 parts of potassium 2-methoxynaphthalene-6-sulphonate, 6 parts of anhydrous zinc chloride and 40 parts of glacial acetic acid are stirred and maintained at 60° C. for 16 hours. The mixture is then poured into cold water and the precipitate which forms is filtered off and washed with water. The residue is dissolved in cold methanol, the methanol solution is filtered from insoluble matter and evaporated to dryness. There is thus obtained a new compound which is sparingly soluble in water, but which is readily soluble in dilute caustic soda or hydrochloric acid, forming clear, foaming solutions. The new compound is a zinc salt of a sulphonic acid having the following probable formula:

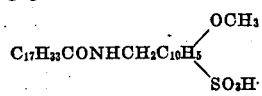

The products of the invention are useful as scouring, lathering, wetting out, foaming, cleansing, lime-soap dispersing, emulsifying and penetrating agents for the treatment of textiles, leather and the like.

As many apparently widely different embodiments of this invention may be made without departing from the spirit and scope thereof, it is to be understood that the invention is not limited to the specific embodiments thereof except as defined in the appended claims.

We claim:

1. Sulphonated amides having the general formula:

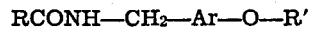

wherein R stands for an aliphatic radical which contains at least 8 carbon atoms, Ar represents an aromatic radical selected from the class consisting of radicals of the benzene series which carry a sulphonic acid group and radicals of the naphthalene series which carry a sulphonic acid group, and R' denotes a member of the group consisting of hydrogen, unsubstituted alkyl radicals, hydroxy substituted alkyl radicals, alkoxy substituted alkyl radicals, halogen substituted alkyl radicals, alkyl radicals carrying a —COOCH₃ substituent, hydrocarbon radicals of the benzene series, and the benzyl radical.

2. Sulphonated amides having the general formula:

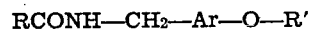

wherein R stands for a straight chain aliphatic hydrocarbon radical which contains from 11 to 17 carbon atoms, Ar represents an aromatic radical of the benzene series which carries a sulphonic acid group, and R' denotes an unsubstituted alkyl radical.

3. The sulphonated hydroxybenzylamides of coconut oil fatty acids.

4. Sulphonated lauromethoxybenzylamide.

5. Sulphonated stearomethoxybenzylamide.

ALFRED WILLIAM BALDWIN.
HENRY ALFRED PIGGOTT.
FRANCIS SYDNEY STATHAM.